United States Patent Office 3,133,031
Patented May 12, 1964

3,133,031
PROCESS FOR BONDING CELLULOSIC
PARTICLES
John W. Maxwell, Wilton, Conn., and Clifford C. Booth
and Thomas F. Duncan, Bainbridge, N.Y., assignors to
The Borden Company, New York, N.Y., a corporation
of New Jersey
No Drawing. Filed Mar. 22, 1961, Ser. No. 97,430
6 Claims. (Cl. 260—17.3)

This invention relates to the process of bonding water penetrable materials with urea formaldehyde resin compositions. The invention is particularly useful in bonding wood flakes into particle boards and will be illustrated by description in connection with such use.

When it has been attempted heretofore to use urea formaldehyde resins with the usual acid curing agents, the aqueous resin composition containing sufficient acid to give a suitably rapid rate of cure has been subject to gelation or premature thickening, i.e., has only a short usable pot life. In addition, the resin on the surface of the chips tends to be precured by the hot upper platen before the press has closed resulting in a condition known to the trade as surface precure and characterized by the presence of little or no bond between the surface chips and the body of the mat.

Briefly stated, the invention comprises the herein described process in which fibrous, cellulosic, lignocellulosic or like materials to be bonded are pretreated with an aqueous dispersion of an acidic curing agent for urea formaldehyde resin, the resin is applied to the pretreated surface of the material and the resin then cured at an elevated temperature.

Proceeding in this manner we have obtained in black willow flake boards, for example, increases in modulus of rupture ranging up to nearly 20% over that obtained with typical commercial urea formaldehyde resin compositions in short pressing cycles without the pretreatment of the particles. We have correspondingly improved the products, as in lower water absorption on soaking in water.

The material to be bonded is any one that is porous to the extent of being penetrable by flowable aqueous solutions and subject to deterioration at excessively high temperature such as 200° F. or so. Examples are lignocellulosic and cellulosic particles, fibers, and sheets, for example, wood flakes for use in particle board, paper stock, veneers for making plywood, wood flour for the manufacture of molded shapes, and rag fibers.

The resin for use in the bonding is any acid curable condensation product of formaldehyde with urea, either alone or with melamine, as in the proportion of about 5%–50% of the weight of the urea.

The acidic curing agent used is a water soluble acid or acidic salt having a $pK_a$ value less than 5.5 and suitably less than 5, $pK_a$ being the negative logarithm of the dissociation constant and numerically equal to the pH of the acidic substance when buffered to the degree caused by half neutralization by a strong base. Examples of curing agents that illustrate the class to be used are acetic, phosphoric, hydrochloric, sulphuric, nitric, chloroacetic, and oxalic acids, and ammonium nitrate, chloride, sulfate and silicofluoride, all being used in aqueous solution. The acidic salts are examples of acid donors that may be used. The donors provide acid, as by hydrolysis in the aqueous solution or under the influence of heat.

The urea referred to in certain tables herein is ordinarily urea crystals added to a commercial urea formaldehyde condensate used as the resin.

As to proportions, the selected acid or acid donor such as the acidic salts is used in amount to establish, in the surface portions of material to be bonded, a pH below 5 but not lower than about pH 2 if a durable board is desired. Low pH glue lines have poor durability. This requires ordinarily about 0.01% to 1% of the acidic curing agent for 100 parts of lignocellulosic or like material to be bonded.

The resin is used in the amount of about 3%–15% of the weight of the particles to be bonded.

As to conditions, a part of the acidic curing agent is ordinarily included in the resin composition and the remainder of the agent applied as the pretreatment to the particles to be bonded. For 100 parts of urea formaldehyde resin for example, we may and usually do, include in the prepared dispersion of it about 0.5–1.5 parts e.g., 0.7 part of an acidic salt such as ammonium chloride, ammonium sulphate or a mixture of both. The remainder of the acidic agent is applied to the particles in the pretreatment thereof as by being sprayed in solution form upon the particles to be bonded or in any other usual manner for distributing a relatively small amount of an aqueous solution on particles of wood or the like. The equipment used is conventional and is not illustrated. It is convenient to tumble or stir the mass of particles as the acidic agent and later the resin are being applied, as, for example, in the usual type of ribbon blender, drum tumbler, twin screw blender or other device in which fresh surfaces of particles are substantially continuously exposed for the application as the machine operates.

The particles with the pretreatment and the resin application are then shaped into form desired for the bonded article, pressed to consolidate the mass and establish thorough contact between the adjacent particles and the whole then subjected to an elevated temperature to cause curing, as in a usual steam heated press.

Pressures used are those that are conventional in the particle board or other industry in which the process is used. So are the temperatures and times of curing except that they are reduced below those temperatures and times which, if used, cause discoloration, loss of strength or both. Suitable conditions are press time within the range 4 to 20 minutes, and temperatures of 280° to 370° F., longer times within the range stated being used at the lower of the temperatures stated and vice versa. A representative set of conditions uses press times of 4–6 minutes at 290°–320° F. for thick boards. For any combination of conditions a few simple runs will show the optimum times and temperatures to be employed subsequently for the same conditions.

In all cases the amount of the acidic curing agent introduced in advance into the resin solution is less than that causing gelation of the resin and also less than the required amount for quickly curing under the conditions of final curing as described.

Premature gelling or objectionable thickening of the resin composition does not occur. Also, elapsed time of at least 10 minutes is permissible after the resin composition is applied to the pretreated particles to be bonded. Yet, in the final pressing and heating in contact with the particles pretreated with the acidic material, there is rapid curing of the resin composition, particularly on the particles on the board surface without the attendant precure associated with the more conventional fast curing urea formaldehyde resin systems.

The invention will be further illustrated by description in connection with the following specific examples. In these examples and elsewhere herein, proportions are expressed as parts by weight on the dry basis unless specifically stated to the contrary. The ammonium hydroxide was weighed as the 26° Bé. solution.

*Examples 1–5*

The ammonium salts were sprayed as a solution in water of 10% concentration upon the particles and the acetic and phosphoric acid were sprayed on as 10% aqueous solutions. The pressure applied in the press cycle was approximately 350 p.s.i. and the temperature was 290° F., in making a particle board of finished thickness about 0.75 inch. Gel times were determined at 90° F. Abbreviations used are "Amm." for ammonium; "Sulf.," sulfate; "UF," urea formaldehyde; "MOR," modulus of rupture; "WA," water absorption; "Exp.," thickness expansion on soaking for the times shown; and "Int.," internal bond or breaking tension perpendicular to the horizontal plane of the board.

*Example 8*

The procedure and composition of Example 3 are followed except that the phosphoric acid there used is replaced by 0.1 part of any of the other acids disclosed herein.

*Example 9*

The procedure and composition of Example 1 are used except that the urea formaldehyde (UF) resin there used is replaced by 70 parts of the said UF resin and 30 parts of an acid curable melamine formaldehyde resin.

In general the adhesives made as described avoid the shortness of pot life that has characterized previous urea formaldehyde adhesives of satisfactorily rapid rate of curing at the elevated temperatures of pressing. At the same time the adhesives give, with the pretreated wood particles or the like, the desired speed of setting during the said pressing; and the resin undergoes thickening or setting on contact with the acid at the surface of the particles being bonded, so as to close surface pores and prevent looseness of surfaces which has been a problem heretofore in making particle boards and the like of highest acceptability.

It will be understood that it is intended to cover all changes and modifications of the examples of the invention herein chosen for the purpose of illustration which do not constitute departures from the spirit and scope of the invention.

| Materials used | Examples of invention | | | | | Comparison boards | | |
| --- | --- | --- | --- | --- | --- | --- | --- | --- |
| | 1 | 2 | 3 | 4 | 5 | (a) | (b) | (c) |
| Wood flakes, 100 parts | Black Willow. | Black Willow. | Black Willow. | Black Willow. | Aspen. | Black Willow. | Black Willow. | Aspen. |
| Pretreatment, parts | Ammonium sulf., 0.2. | Acetic acid, 0.2. | Phosphoric acid, 0.1. | Ammonium sulf., 0.2. | Ammonium sulf., 0.2. | None. | None. | None. |
| Adhesive, 7 parts total: | | | | | | | | |
| UF resin | 100 | 100 | 100 | 100 | 100 | 100 | 100 | 100. |
| Amm. chloride | 0.7 | 0.7 | 0.7 | | | 0.7 | 0.7 | 0.7. |
| Amm. sulfate | | | | 0.7 | | | | |
| Amm. hydroxide | 1.0 | 1.0 | 1.0 | 1.0 | 1.0 | 2.5 | | |
| Urea | 5.0 | 5.0 | 5.0 | 5.0 | 5.0 | 5.4 | 5.4 | 5.0. |
| Water | 5.0 | 5.0 | 5.0 | 5.0 | 5.0 | 5.4 | 5.4 | 5.0. |
| Gel time, hrs | 9.0 | 9.0 | 9.0 | 9.0 | 9.0 | 21.5 | 3.5 | 3.5. |
| Press cycle, min | 6.5 | 7.0 | 6.5 | 6.5 | 5.0 | 10.0 | 8 | 6.0. |
| Properties of resulting composition board: | | | | | | | | |
| MOR, p.s.i | 3,070 | 2,970 | 3,081 | 2,809 | 4,155 | 2,950 | 2,578 | 4,318. |
| WA percent, 24 hrs | 39.5 | 35.2 | 31.9 | 29.4 | 35.0 | 99.2 | 75.0 | 33.9. |
| Exp. percent, 24 hrs | 4.7 | 6.4 | 4.8 | 5.2 | 4.4 | 42.6 | 19.2 | 4.4. |
| Int. bond, p.s.i | 157 | 62 | 78 | 103 | 142 | 73 | 48 | 106. |

Subsequent to the desired acid pretreatment of the selected wood flakes (Examples 1–5), a 7% solids (basis of oven dry weight of wood) treatment of a catalyzed UF resin, i.e., Casco Resin WW-15 was applied to the flakes. Both the acid donor and UF resin were separately added to the flakes in a horizontal ribbon type blender by use of an external spray system. Boards, ¾" x 14½", representing a single density (42 lbs./cu.ft.) were performed (by mat consolidation) at a pressure of 375 p.s.i. prior to the final pressing and curing at 290° F. and approximately 350 p.s.i.

Times shown in the table are the minimum press times for the particular mix at which satisfactory physical properties of the resulting board were obtained.

*Example 6*

The procedure and composition of Examples 1–4 are used in turn except that the black willow particles are replaced by 100 parts of any other of the lignocellulosic or cellulosic materials described herein, in equal proportion by weight.

*Example 7*

The procedure and composition of Example 1 are used except that the ammonium sulphate that is applied as a pretreatment to the wood flakes is replaced by 0.2 part of any of the other acidic salts disclosed herein for the pretreatment.

We claim:
1. The process of bonding water penetrable cellulosic particles which comprises spraying upon the particles in unmoistened condition an aqueous solution of an acidic curing agent for urea formaldehyde resins, then spraying the said particles with an aqueous solution of the urea formaldehyde resin, forming the resulting mass into shape desired, and then pressing and heating the mass to the temperature of curing of the resin in contact with the acidic curing agent, amounts used on the dry basis for 100 parts by weight of the particles being about 0.1–1 part of the curing agent and 3–15 parts of the resin.

2. The process of claim 1, the curing agent being an acidic material of $pK_a$ below about 5.5, being selected from the group consisting of water soluble acids and acidic salts, and being used in proportion to establish in the surface portion of the said particles a pH approximately within the range 2–5.

3. The process of claim 1, the curing agent being ammonium sulfate.

4. The process of claim 1, the said particles being wood.

5. The process of claim 1, the said aqueous solution of urea formaldehyde resin as sprayed upon the particles including an admixed acidic curing agent selected from the group consisting of water soluble acids and acidic salts in the proportion of about 0.3–1.5 parts for 100 parts dry weight of the resin.

6. In making a particle board, the process which comprises spraying 100 parts by weight of wood flakes in unmoistened condition with an aqueous solution of 0.1–1 part of an acidic curing agent for urea formaldehyde resin, spraying the flakes with a urea formaldehyde resin solution containing approximately 3–15 parts of the resin and an admixed water soluble acidic salt of $pK_a$ below 5.5 in the amount of about 0.3–1.5 parts for 100 parts of the said resin, pressing the resulting mass to shape desired and to consolidate the materials therein, and then heating the mass at a temperature of about 280°–370° F. for about 4–20 minutes, to cure the resin.

References Cited in the file of this patent

UNITED STATES PATENTS

| | | |
|---|---|---|
| 2,180,547 | Peterson | Nov. 21, 1939 |
| 2,527,795 | Caughey | Oct. 31, 1950 |
| 2,549,563 | Barnstead | Apr. 17, 1951 |
| 2,873,260 | Corwin | Feb. 10, 1959 |